March 24, 1936.　　　　M. P. YOUKER　　　　2,035,209
PROCESS AND APPARATUS FOR MANUFACTURING MOTOR FUELS
Filed Feb. 12, 1932　　　2 Sheets-Sheet 1

INVENTOR.
Malcolm P. Youker
BY
Robt. E. Barry
ATTORNEY.

Patented Mar. 24, 1936

2,035,209

UNITED STATES PATENT OFFICE 2,035,209

PROCESS AND APPARATUS FOR MANUFACTURING MOTOR FUELS

Malcolm P. Youker, Bartlesville, Okla., assignor to Phillips Petroleum Company, Bartlesville, Okla., a corporation of Delaware Application February 12, 1932, Serial No. 592,614

9 Claims. (Cl. 196—58)

This invention relates to improvements in processes for converting hydrocarbon liquids or gases.

An object of the invention is to provide a process by which gasoline having a high anti-knock rating and other desirable qualities may be manufactured directly from crude oil.

Another object is to minimize the losses due to conversion of liquids to gases which normally results from the conversion of heavy hydrocarbon liquids to lighter hydrocarbon liquids.

These desirable ends, as well as others, are attained by the process.

With the foregoing objects outlined and with other objects in view, which will appear as the description proceeds, the invention consists in the novel features hereinafter described in detail, illustrated in the accompanying drawings and more particularly pointed out in the appended claims.

The form of apparatus by which my new process is carried out is illustrated on the accompanying drawings.

Figure 1:
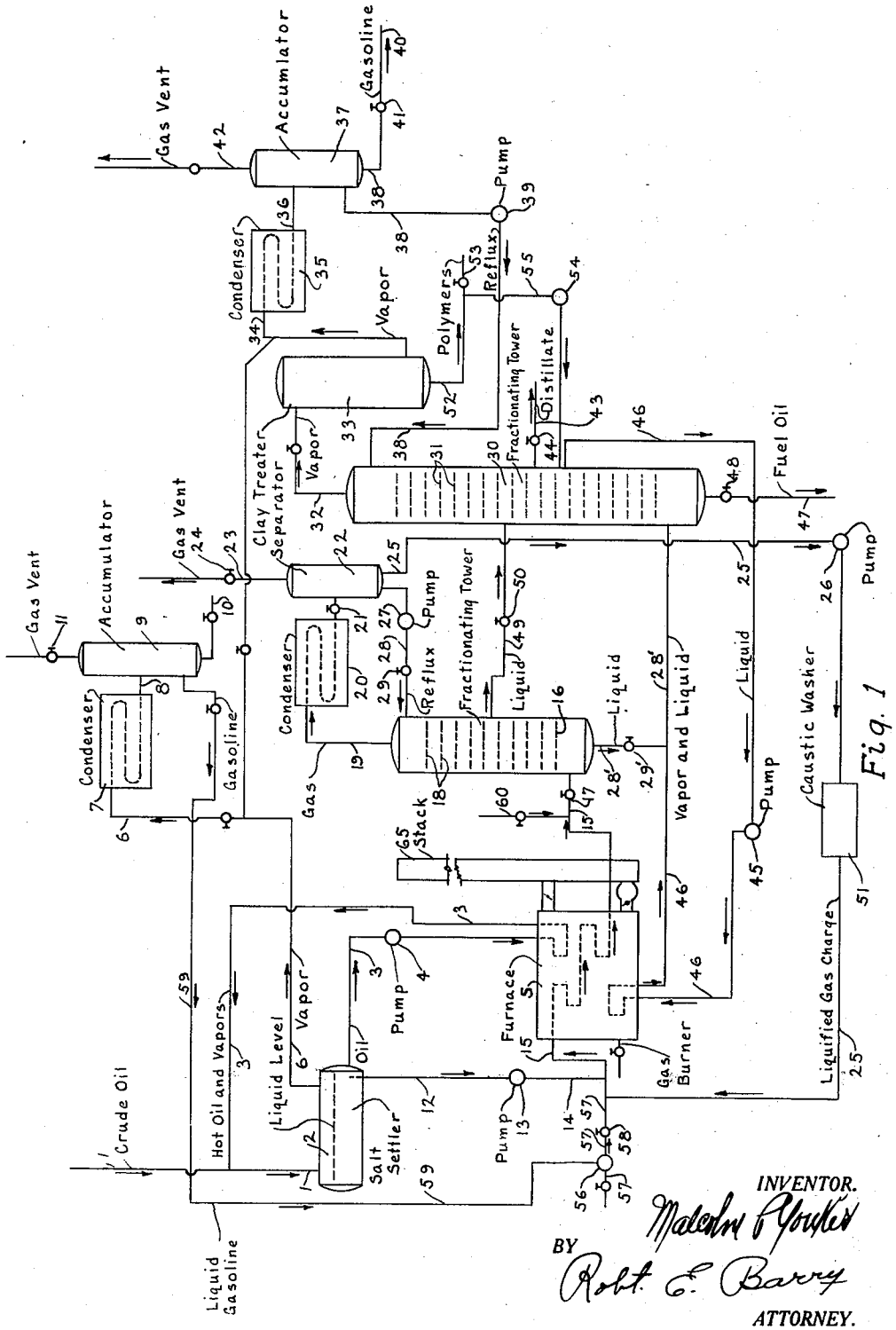
Figure 1 illustrates in elevation the complete apparatus.

Crude oil will be delivered through the pipe 1 into the salt settler 2 which is a horizontal cylindrical tank. A liquid level normally above the center of the salt settler 2 will be maintained. Liquid will be delivered from the tank 2 through the pipe 3 by means of the pump 4 through a furnace 5 and into the pipe 1. The liquid thus delivered through pipe 3 will be heated in passing through the furnace 5 and being delivered into the pipe 1 will mix with and heat the crude oil flowing through the pipe 1 into the salt settler 2. As a result of heating the crude oil entering the salt settler 2, vapors will be generated therein, and these vapors will flow through the pipe 6 into condenser 7. Condensate will flow from the condenser 7 through the pipe 8 into the accumulator 9. The temperature maintained in the salt settler 2 will be insufficient to crack the oil and only such that gasoline vapors distilled therefrom will flow into the condenser 7 and, therefore, gasoline only will be accumulated in the accumulator 9. Gasoline may be withdrawn from the accumulator 9 through the valved pipe 10. Gases will be vented from the accumulator 9 through vent pipe 11. Liquid will be withdrawn from the salt settler 2 through a pipe 12 by a pump 13 and will be delivered by pump 13 through pipe 14 and thence through a heating tube 15 which passes through furnace 5 and delivers into the lower portion of fractionating tower 16. A valve 17 which is mounted in heating tube 15 between furnace 5 and fractionating tower 16 will be utilized to maintain pressure in heating tube 15. Liquid which is passed through the heating tube 15 will be heated therein and will, upon entry into the fractionating tower 16, to a large extent vaporize, and the vapors thus generated will flow upward through the fractionating tower 16 and bubble trays 18, and thence through pipe 19 and condenser 20 and pipe 21 into the gas-liquid separator 22.

Gas which will accumulate in the separator 22 in gaseous condition will be vented therefrom through the pipe 23 in which is mounted a valve 24. A part of the gas which will accumulate in liquid state in the separator 22 will be pumped therefrom through the pipe 25 by means of the pump 26 into and through heating tube 15. A part of the liquefied gas which will accumulate in the separator 22 will be delivered thence by pump 27 through pipe 28 in which is mounted valve 29 into the top of fractionating tower 16. As a result of delivering said liquid through pipe 28 into the top of fractionating tower 16, liquid reflux will flow downward through fractionating tower 16 over bubble trays 18 and will contact and condense a portion of the vapors which will rise through fractionating tower 16, and as a result of said condensation, liquid, consisting of gasoline and heavier fluid, will accumulate in the fractionating tower 16. Liquid which will collect in the bottom of fractionating tower 16 will flow thence through pipe 28' in which is mounted a valve 29' into a fractionating tower 30 at a point below the bubble trays 31 which are mounted in fractionating tower 30.

Pressure will be maintained in fractionating tower 16 in excess of the pressure which will be maintained in the fractionating tower 30, and, as a result, liquid flowing from fractionating tower 16 through pipe 28' into fractionating tower 30, will partially vaporize upon entry into fractionating tower 30, and vapors thus generated will flow upward through bubble plates 31 in fractionating tower 30, and thence through pipe 32, clay treater 33, pipe 34, and condenser 35. Condensate will flow from condenser 35 through pipe 36 into accumulator 37.

A sufficient quantity of the liquid which will gather in the accumulator 37 will be pumped therefrom through pipe 38 by means of pump 39 into the top of fractionating tower 30 to maintain a temperature at the top of fractionating tower 30 such that only gasoline vapors will pass therefrom to the condenser 35. Thus gasoline only will be delivered into the accumulator 37.

Gasoline will be withdrawn from accumulator 37 through the pipe 40 in which is mounted valve 41. Gas will be vented from accumulator 37 through vent pipe 42. As a result of introducing cold gasoline into the top of fractionating tower 30, reflux liquid will flow downward over bubble plates 31 and will condense that part of the vapors arising through fractionating tower 30 which is heavier than gasoline. Distillate which is heavier than gasoline may be withdrawn from one of the bubble trays 31 which is intermediate between the point of entry of pipe 28' in fractionating tower 30 and the top of fractionating tower 30 through a pipe 43 in which is mounted a valve 44. Distillate will be delivered by a pump 45 from one of the bubble plates 31 through a pipe 46 which will pass through furnace 5 and lead into the pipe 28'.

The liquid which will be passed through pipe 46 will be heated in passage through furnace 5 and will, upon entry into the pipe 28', heat the liquids which will flow from the fractionating tower 16 through the pipe 28'.

Fuel oil will be withdrawn from the bottom of fractionating tower 30 through pipe 47 in which is mounted valve 48. A pipe 49 in which is mounted a valve 50 will serve to conduct liquid from an intermediate one of the bubble trays 18 in fractionating tower 16 into fractionating tower 30 at a point above the entry point of pipe 28' into fractionating tower 30.

A conventional caustic washer 51 is mounted in the pipe 25 and serves to remove hydrogen sulfide and other impurities from the liquefied gas which flows through the pipe 25.

A pump 56 is mounted in a pipe 57 in which is mounted a valve 58 and which leads into heating tube 15 by means of which straight run gasoline, hydrocarbon gas, either in liquid or gaseous form, fuel oil, hydrogen, or any other hydrocarbon material or treating agent may be introduced into and passed through the heating tube 15. I may elect to deliver gasoline collected in the accumulator 9 into and through the heating tube 15 by means of the pump 56 and the valved pipe 59.

Water or water containing treating agents, either in suspension or in solution, or treating agents alone, may be introduced through valved pipe 60 into the heated hydrocarbon which will flow from the furnace through heating tube 15 into fractionating tower 16.

Crude oil being preheated and delivered into salt settler 2 will flow slowly through this salt settler and any salt contained in the crude, as well as other debris, will be settled from the crude therein and will be periodically removed.

A body of fuller's earth will be so disposed in the clay treater 33 that vapors may readily flow through this body of clay and intimately contact the particles thereof. Polymerized hydrocarbon liquids which will be formed in the clay treater 33 as a result of the contact between vapors and fuller's earth therein, will be withdrawn therefrom through a pipe 52 in which is mounted a valve 53. These polymerized hydrocarbons may either be withdrawn to storage or they may be delivered by means of a pump 54 which is mounted in a pipe 55 into fractionating column 30.

The pressure maintained in the salt settler 2 will be only that which is set up therein by resistance to flow of vapors through the pipe 6 and the condenser 7. Although good results may be obtained at lower pressures, I will preferably maintain a pressure of approximately 3000 pounds per square inch in the heating tube 15. Normally, the pressure set up at the discharge of the pumps 13 and 26 will be 3000 pounds per square inch, and pressure taken at intermediate points along the heating tube 15 will be less than 3000 pounds per square inch by the amount of friction heat between the point of which such pressure is taken and said pumps. A pressure of between 200 pounds per square inch and 1000 pounds per square inch, preferably about 500 pounds per square inch, will be maintained in the fractionating tower 16, the separator 22, the condenser 20, and inter-connecting pipes.

The pressure maintained in the fractionating column 30, the clay treater 33, the condenser 35 and inter-connecting lines will be only in excess of atmospheric pressure, to the extent that pressure is set up by reason of the resistance to flow of vapors and condensate through this system, as the accumulator 37 will be operated at approximately atmospheric pressure.

The length of that part of the pipe 3 which will be exposed to heat in the furnace 5 will be so proportioned that the liquid which will enter the salt settler 2 will be heated to about 250° F. Therefore, nothing heavier than gasoline will be vaporized in the salt settler 2.

By regulation of the quantity of fuel fired in the furnace 5, the temperature to which the liquid passed through heating tube 15 will be heated will vary between 800° F. and 900° F., and this temperature will preferably be between 845° F. and 865° F. The temperatures maintained at the top of the fractionating tower 16 by means of regulating the delivery of reflux liquid into the top of this tower will be such that the vapor pressure of the liquid leaving the bottom of this fractionating tower will be in accord with the current specifications for motor fuel, which at this time vary between 8 pounds per square inch and 13 pounds per square inch when taken by the Reid method at 100° F. That part of the pipe 46 which will be exposed to heat in the furnace 5 will be so proportioned that the bottom of the fractionating tower 30 will be heated to the extent necessary to remove from the liquids which will collect in the bottom of fractionating tower 30 practically all gasoline fractions.

The heating tube 15 is divided into a heating portion and a conversion portion after the manner which has already been disclosed in applications for patent filed by the present applicant under the following listed patent applications:

U. S. Serial No. 559,083, filed—August 24, 1931;
U. S. Serial No. 545,309, filed—June 18, 1931;
U. S. Serial No. 579,044, filed—December 4, 1931;
U. S. Serial No. 579,538, filed—December 7, 1931.

As outlined in the above mentioned applications for patents, in order to avoid rapid deposition of coke in the apparatus and to at the same time obtain satisfactory conversion in the heating tube 15 of the materials passed therethrough, it is desirable to first rapidly heat these materials to conversion temperatures in the first part of the heating tube 15 and then pass the thus heated material through a latter portion of the heating tube 15 which is so arranged in the furnace as to be only mildly heated.

Figure 3:
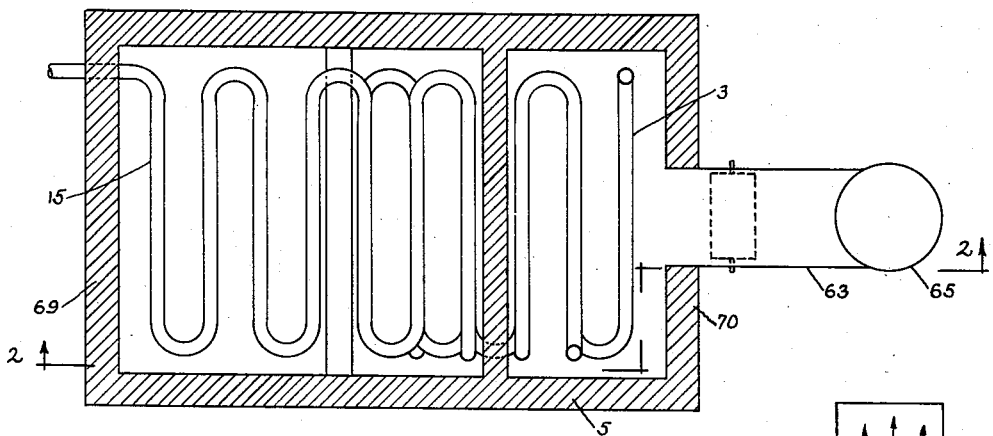
Figure 3 is a plan view of the furnace 5, the top of which is shown removed thus revealing the arrangement of the baffle walls and heating tubes in the interior of the furnace.
Figure 2:
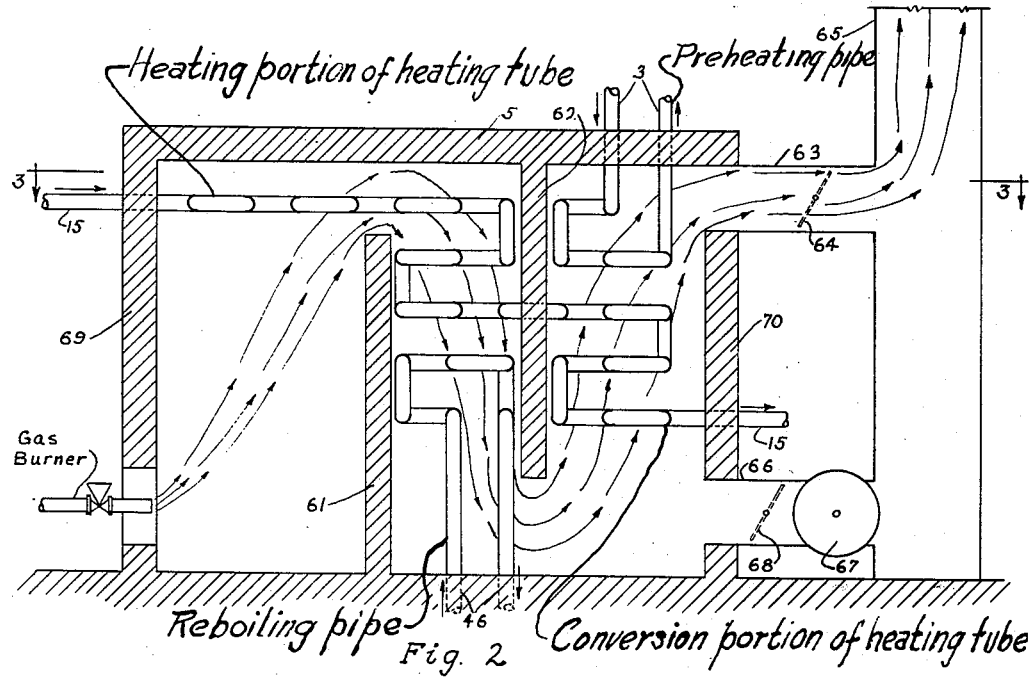
Figure 2 is an elevation of the furnace 5 shown in Figure 1, the side wall of the furnace being shown removed and the arrangement of the heating tubes and baffle walls in the furnace thereby being revealed.

Referring to Figures 2 and 3 of the drawings, it will be noted that the interior of the furnace 5 is so partitioned off by a bridge wall 61 and a baffle wall 62 that a combustion chamber is formed between bridge wall 61 and the end wall 69 of the furnace and that gases of combustion developed in this combustion chamber are restricted to flow upward over the top of bridge wall 61 thence downward through a passageway between bridge wall 61 and baffle wall 62 thence under baffle wall 62 and thence upward through a passage-way between bridge wall 62 and the adjacent end wall 70 of the furnace and thence through a breeching 63 in which is mounted a damper 64 and thence upward through a smoke stack 65. A breeching 66 in which is mounted a fan 67 and a damper 68 is interconnected between the bottom of said last-mentioned passage-way between said baffle wall and said adjacent end wall and the bottom of said smoke stack 65. The fan 67 may be operated to force gases of combustion from the smoke stack into the furnace, thus recirculating gases of combustion through said last-mentioned passage-way, or said fan may be allowed to remain stationary in which case gases of combustion will flow from the furnace into the smoke stack through the breeching 66, and in either case the damper 68 may be used to regulate the flow of gases of combustion through the breeching 66. Temperature recording devices not shown on the drawings are of course installed at the junction of the heating portion and the conversion portion and at the outlet of the heating tube 15 to indicate and record the temperature of material passing through the heating tube at these points.

The heating tube 15 is made up of a plurality of horizontal tubes interconnected by means of return bends in a conventional manner and is supported in the furnace by conventional tube sheets which are not shown. That portion of the heating tube 15 which is utilized for the rapid heating of the materials passed therethrough to conversion temperature is so disposed over the combustion chamber and in the passage-way between bridge wall 61 and baffle wall 62 that gases of combustion developed in the combustion chamber immediately and before contacting any other heat absorbing surface are contacted therewith. The conversion portion of the heating tube 15 in which conversion of the materials passed therethrough takes place is disposed in the passage-way between the baffle wall 62 and the adjacent end wall 70 of the furnace. That portion of the pipe 46 which passes through the furnace 5 is disposed in the passage-way between bridge wall 61 and baffle wall 62 and in a position below the heating portion of the heating tube 15. That portion of the pipe 3 which passes through furnace 5 is disposed in the passage-way between the baffle wall 62 and the adjacent end wall 70 of the furnace in a position above the conversion portion of the heating tube 15.

It will be seen that the flow of gases of combustion through the furnace 5 is such that these gases first contact the heating portion of the heating tube 15; second, contact that portion of the pipe 46 which passes through the furnace 5; third, contact the conversion portion of the heating tube 15; and, fourth, contact that part of the pipe 3 which passes through the furnace 5. The quantity of liquid which will be pumped through the pipe 46 will be so regulated and the length and size of that portion of the pipe 46 which is disposed in the furnace 5 will be so proportioned as to reduce the temperature of the gases of combustion passing around the pipe 46 to any desired temperature before these gases contact the conversion portion of the heating tube 15. Increasing the flow of oil through pipe 46 will cool the gases of combustion passing over the conversion portion of the heating tube 15 to any desired temperature and in this way heat transfer from the gases of combustion to the conversion portion of the heating tube 15 may be caused to take place at a low rate and the quantity of heat so transferred may be regulated. It is apparent that some other stream of liquid might be passed through the pipe 46 to accomplish this purpose and that my reasons for using the particular stream of liquid designated are economic.

The manner in which the breeching 66, together with the fan 67 and the damper 68, may be advantageously used to abstract gases of combustion from the furnace before the same have passed over the conversion portion of the heating tube 15 or to force recirculation of gases from the smoke stack back into the furnace and over said conversion portion of said tube is already disclosed in the above-mentioned patent application Serial No. 579,044 previously filed by the present applicant. Circulating gases of combustion from the bottom of the smoke stack 65 by means of the fan 67 through the breeching 66 into the furnace and thence upward through the passage-way between baffle wall 62 and end wall 70 and thence through breeching 63 into smoke stack 65 in regulated quantities will result in regulated cooling of the gases of combustion prior to their passage over the conversion portion of heating tube 15, thus permitting regulated moderate heating of the materials passing through the conversion portion of heating tube 15. Withdrawing gases of combustion in regulated quantities from the furnace 5 into smoke stack 65 through the breeching 66 will result in regulating the quantity of gases of combustion which will flow over the conversion portion of the heating tube 15 and will thus result in the regulated moderate heating of the materials passing through the conversion portion of the heating tube 15.

It should be noted that while finally contacting gases of combustion with the preheating pipe 3 is an economic arrangement the principally advantageous feature of the furnace and heating arrangement shown is that the gases of combustion after being contacted with the heating portion of the heating tube 15 are cooled by being contacted with the heating pipe 46 before being contacted with the conversion portion of the heating tube 15, thus permitting mild heating of said conversion portion of said tube.

The materials passed through the heating tube 15 should be heated in passing therethrough to a maximum temperature in the heating portion of this tube and the temperature of these materials should not thereafter be increased in passing through the conversion portion of the tube. In other words, a portion of the heating tube 15 adjacent to the exit end of said tube should be heated in a manner such that only heat absorbed by the conversion reaction is supplied to the materials flowing therethrough and such that the temperature of such materials is not increased in passing through this latter portion of said heating tube. The conversion portion of the heating tube 15 should be of substantial length. While some results may be obtained by using a three inch inside diameter tube as short as 500 feet, it is desirable to use a three inch inside diameter tube at least 2,000 feet long, and preferably 3,000 or 4,000 feet long, for conversion purposes, through which the material to be converted is flowed after such material has been brought to conversion temperature. While I have described the desirable conditions which should be obtained in the conversion portion of the heating tube 15, I would say that in order to obtain results sufficiently practical to permit commercial operation it is absolutely necessary that not less than the latter 500 linear feet of the heating tube 15 be supplied with heat in quantity such that the temperature of the materials passing therethrough be raised not more than two degrees Fahrenheit per 100 feet of travel through said latter portion of heating tube 15 and as stated above heat should preferably be supplied to the materials passing through the latter portion of said heating tube in considerably less than this quantity.

The maximum advantageous temperature to be used will be found to vary with the type of material undergoing conversion. I have constructed and have in operation two heating tubes similar to the heating tube 15 herein described, one of which is used for the conversion of heavy fuel oil to gasoline and gas oil and one of which is used for converting gas oil to gasoline. I find that maintaining temperatures of approximately 850° F. and 840° F., respectively, at the inlet and the outlet of the conversion portion of the heating tube obtains very good results in the conversion of the fuel oil when operated under a pressure of about 350 pounds per square inch, while for the advantageous conversion of gas oil temperatures of approximately 885° F. and 875° F., respectively, maintained at the inlet and outlet of the conversion portion of the heating tube appear to be the best temperatures when operating under about 350 pounds per square inch pressure. It should be noted that while the present process is specifically outlined for and appears to be particularly advantageous for the conversion of crude oils the process may also be advantageously utilized for the conversion of other oils such as fuel oil or gas oil.

It appears that the conversion of oils, which already contain gasoline, to gasoline may be accomplished particularly well by the combination of steps outlined herein; that is, by passing the same through the heating tube 15 in the manner described under a pressure upwards of 1,500 pounds per square inch particularly the antiknock rating of the gasoline as a whole thus produced from crude oils is high.

While I have described in detail a method by which my new process may be carried out, it is to be understood that I do not intend to limit my claims to these details but intend to claim broadly all of the advantages which are inherent in this process.

I claim:

1. An apparatus of the character described, comprising a furnace having a passageway therethrough, means for creating hot gases of combustion at one end portion of said passageway, means for discharging combustion gases from the other end portion of said passageway, an oil heating tube extending through said passageway and including a heating portion and a conversion portion, a first fractionating tower connected to the outlet end of said tube, a second fractionating tower, a pipe for leading liquid from the first fractionating tower to an intermediate portion of the second fractionating tower, a tube for reheating liquid from the second fractionating tower and for returning the reheated liquid to the second fractionating tower, said reheating tube having a portion extending into the combustion gas passageway of the furnace, said heating tube and the last mentioned portion of the reheating tube being so arranged in the combustion gas passageway that gases of combustion created in one end portion of the passageway and passing to the other end portion of said passageway will pass first over the heating portion of the oil heating tube, second over said portion of the reheating tube, and third over said conversion portion of said heating tube.

2. A process for the conversion of hydrocarbon liquids comprising passing said hydrocarbon liquids first through a heating portion of a tube heated by combustion gases at a high temperature wherein the hydrocarbon liquids are raised to a cracking temperature and afterwards through a conversion portion of said tube wherein the hydrocarbon liquids are maintained at a cracking temperature by passing combustion gases of lower temperature than said first named combustion gases in heat exchange with said conversion portion of the tube, passing oil from a different point of supply through a heating coil and passing hot gases of combustion first over the heating portion of said tube, second over said heating coil and third over said conversion portion of said tube.

3. A process for the conversion of hydrocarbon liquids, comprising passing said liquids first through a heating portion of a tube heated by combustion gases at a high temperature wherein the hydrocarbon liquids are raised to a cracking temperature and afterwards through a conversion portion of said tube wherein the hydrocarbon liquids are maintained at a cracking temperature by passing combustion gases of lower temperature than said first named combustion gases in heat exchange with said conversion portion of the tube, reheating hydrocarbon liquid resulting from the process in a heating coil, preheating hydrocarbon liquid in a preheating coil and then passing some of the last mentioned liquid into the inlet of the heating tube, and passing gases of combustion first over said heating portion of said tube, second over said heating coil, third over said conversion portion of said tube, and fourth, over said preheating coil.

4. A process for the conversion of hydrocarbon liquids comprising heating such liquids to less than cracking temperatures and then separating naturally occurring gasoline from the remainder of the liquids, then passing said remainder of the liquids first through a heating portion of a tube heated by combustion gases at a high temperature wherein the hydrocarbon liquids are raised to a cracking temperature and afterwards through a conversion portion of said tube wherein the hydrocarbon liquids are maintained at a cracking temperature by passing combustion gases of lower temperature than said first named combustion gases in heat exchange with said conversion portion of the tube, passing oil from a different point of supply through a heating coil, and passing hot gases of combustion first over the heating portion of said tube, second, over said heating coil and third over said conversion portion of said tube.

5. A process for the conversion of hydrocarbon liquids, comprising preheating such liquids to less than cracking temperatures and then separating naturally occurring gasoline from the remainder of the liquids, then passing said remainder of the liquids first through a heating portion of a tube heated by combustion gases to a high temperature wherein the hydrocarbon liquids are raised to a cracking temperature, and afterwards through a conversion portion of said tube wherein the hydrocarbon liquids are maintained at a cracking temperature by passing combustion gases of lower temperature than said first named combustion gases in heat exchange with said conversion portion of the tube, passing oil from a different point of supply through a heating coil and passing hot gases of combustion first over the heating portion of said tube, second over the heating coil, and third over the conversion portion of the said tube, a part of the said gasoline being mixed with said remainder of the liquids before the mixture is introduced into the heating portion of the tube.

6. A process for the conversion of hydrocarbon liquids, comprising passing said liquids first through a heating portion of a tube heated by combustion gases at a high temperature wherein the hydrocarbon liquids are raised to a cracking temperature and afterwards through a conversion portion of said tube wherein the hydrocarbon liquids are maintained at a cracking temperature by passing combustion gases of lower temperature than said first named combustion gases in heat exchange with said conversion portion of the tube, maintaining superatmospheric pressure on the liquid while passing through said tube separating a liquid product from the mixture discharged from said tube and passing this liquid product through a reheating coil and passing hot gases of combustion first over said heating portion of said tube, second over said reheating coil, and third, over said conversion portion of said tube.

7. A process for the conversion of hydrocarbon liquids, comprising first passing said liquids through a preheating pipe and heating the same therein to a temperature insufficient for cracking but sufficient for the evaporation of naturally occurring gasoline from the remaining liquid, then separating said gasoline from the remaining liquid, then passing said remaining liquid through a heating portion of a tube heated by combustion gases at a high temperature wherein the said remaining liquid is raised to a cracking temperature and afterwards through a conversion portion of said tube wherein the said remaining liquid is maintained at a cracking temperature by passing combustion gases of lower temperature than said first named combustion gases in heat exchange with said conversion portion of the tube, passing oil from a different point of supply through a heating coil and passing hot gases of combustion first over the heating portion of said tube, second over said heating coil, third over said conversion portion of said tube and fourth over said preheating pipe.

8. A process for the conversion of hydrocarbon liquids comprising passing said hydrocarbon liquids through a primary portion of a tube heated by combustion gases wherein the hydrocarbon liquids are raised to a high temperature and afterwards through a secondary portion of said tube wherein the hydrocarbon liquids are maintained at said temperature by passing combustion gases of lower temperature than said first named combustion gases in heat exchange with said secondary portion of the tube, passing liquid oil from a different point of supply through a heating coil and passing hot gases of combustion first over the primary portion of said tube, second over said heating coil and third over said secondary portion of said tube.

9. A process for the conversion of hydrocarbon fluids comprising passing a hydrocarbon fluid through a primary portion of a tube heated by combustion gases wherein said fluid is raised to a high temperature and afterwards through a secondary portion of said tube wherein the hydrocarbon fluid is maintained at said temperature by passing combustion gases of lower temperature than said first named combustion gases in heat exchange with said secondary portion of the tube, passing another hydrocarbon fluid from a different point of supply through a heating coil, and passing hot gases of combustion first over the primary portion of said tube, second over the heating coil and third over said secondary portion of said tube.

MALCOLM P. YOUKER.